Jan. 15, 1963   W. B. BROWN   3,073,539
REEL-HANDLING APPARATUS
Filed Feb. 8, 1961   4 Sheets-Sheet 1

INVENTOR.
W. B. BROWN
BY S. Gundersen
ATTORNEY

INVENTOR.
W. B. BROWN
BY
*S. Gundersen*
ATTORNEY

Jan. 15, 1963  W. B. BROWN  3,073,539
REEL-HANDLING APPARATUS
Filed Feb. 8, 1961  4 Sheets-Sheet 3
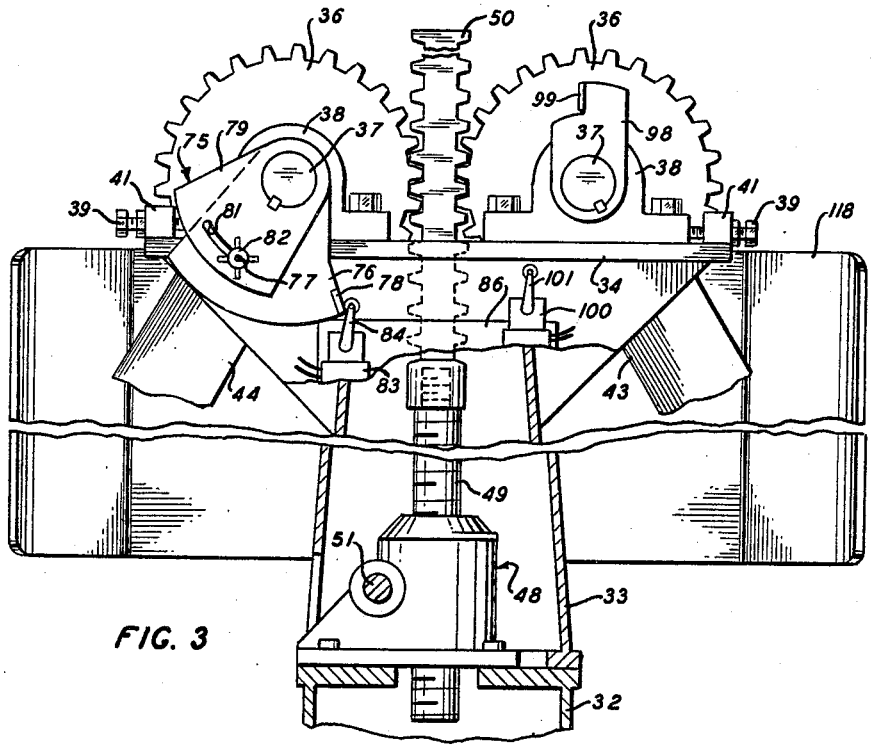
FIG. 3
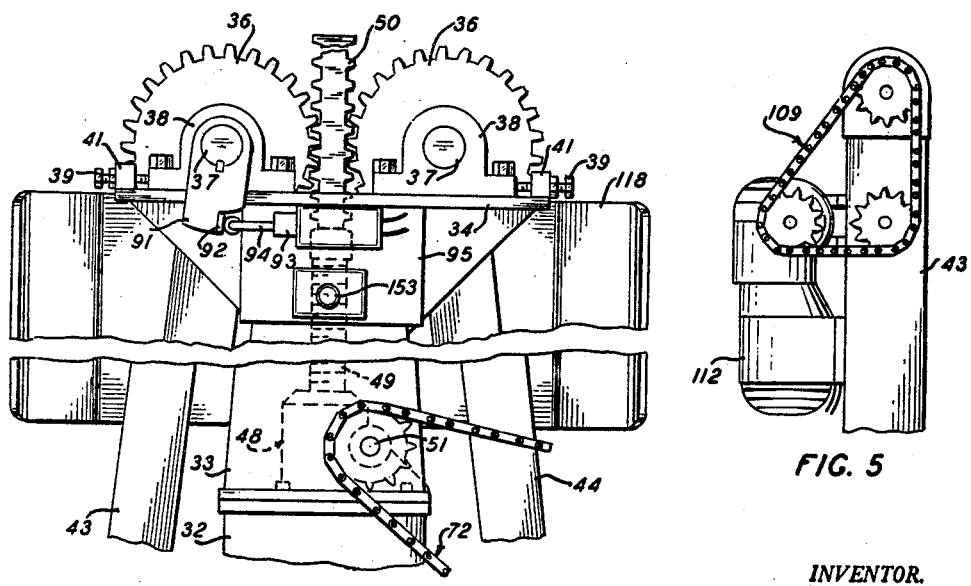
FIG. 4
FIG. 5
INVENTOR.
W. B. BROWN
BY
S. Gundersen
ATTORNEY Jan. 15, 1963  W. B. BROWN  3,073,539
REEL-HANDLING APPARATUS
Filed Feb. 8, 1961  4 Sheets-Sheet 4

INVENTOR.
W. B. BROWN
BY S. Gundersen
ATTORNEY

United States Patent Office 3,073,539
Patented Jan. 15, 1963

3,073,539
REEL-HANDLING APPARATUS
William B. Brown, Pasadena, Md., assignor to Western Electric Company, Incorporated, New York, N.Y., a corporation of New York
Filed Feb. 8, 1961, Ser. No. 87,913
8 Claims. (Cl. 242—54)

This invention relates to reel-handling apparatus and particularly to reel-handling apparatus for elevating reels and for rotatably supporting such elevated reels.

The principal object of this invention is a new and improved apparatus for elevating reels of various diameters and for rotatably supporting such elevated reels.

Apparatus illustrating certain features of the present invention utilizes a framework having a passage into which a reel to be elevated and supported is rolled. A pair of parallel, reel-flange engaging rollers are supported from the framework above the passage so as to allow movement of the reel into and out of the passage. After a reel is moved into the passage, the rollers are moved down in arcuate paths in opposite directions around opposite sides of the reel. The arcuate paths normally intersect the flanges of the reel a predetermined distance above the floor surface and below the central axis of the reel, so that the rollers engage the opposite sides of the flanges of the reel during the downward movement of the rollers. Further movement of the rollers along the arcuate paths and toward each other causes the reel to be lifted above the floor surface so that the reel is rotatably supported on the rollers.

Other objects and advantages of the invention will be apparent from the following detailed description of a specific embodiment thereof, when read in conjunction with the accompanying drawings in which:

FIG. 3 is an enlarged, fragmentary view of the apparatus shown in FIG. 2 as viewed along the line 3—3 thereof with parts thereof broken away for clarity;

FIG. 4 is an enlarged, fragmentary view of the apparatus shown in FIG. 2 as viewed along the line 4—4 thereof;

FIG. 5 is an enlarged, segmental view of a different embodiment of the apparatus shown in FIG. 2, showing a combination of roller drive means with braking means;

Figure 1:
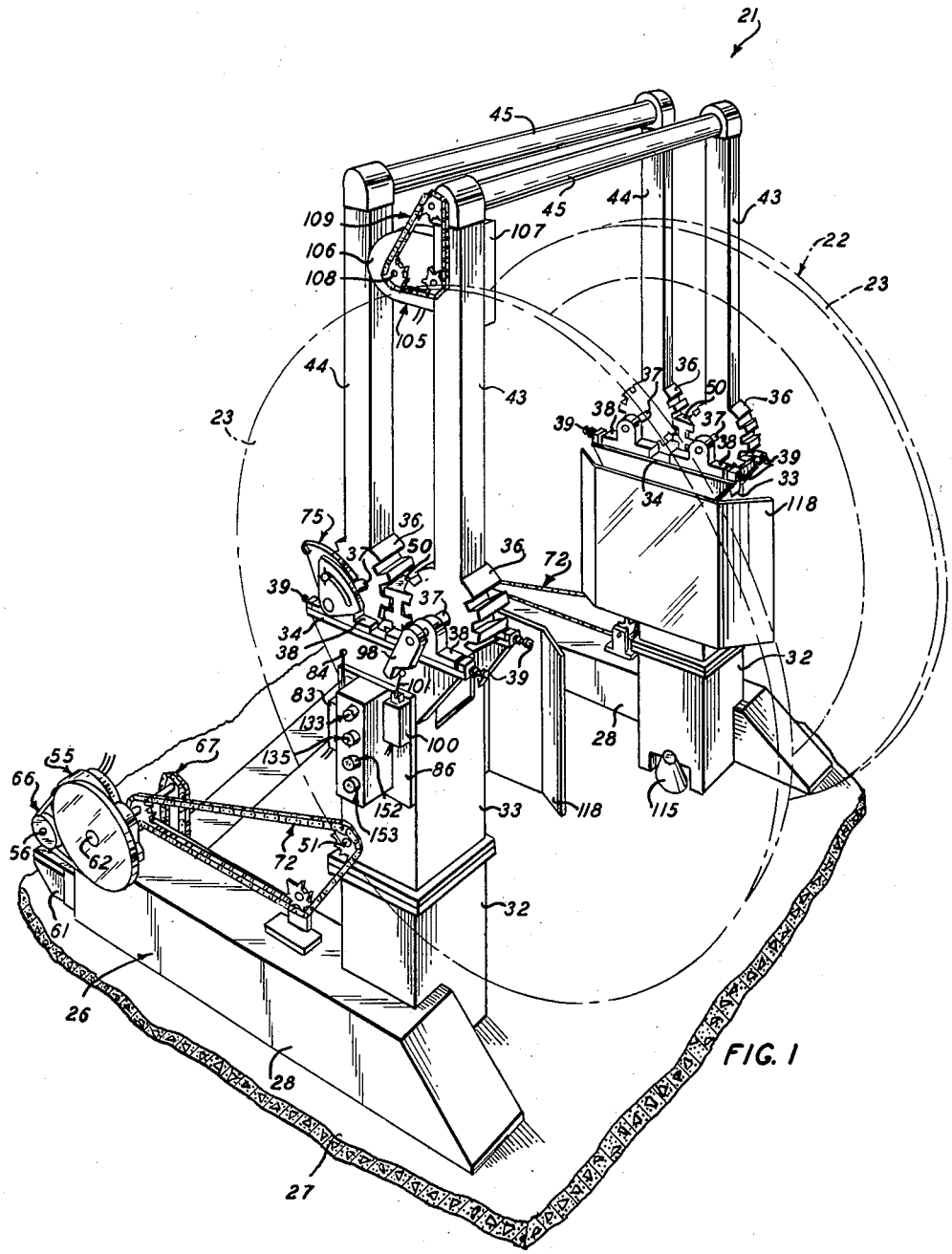
FIG. 1 is a perspective view of an apparatus embodying the invention.

Referring now to the drawings, and particularly to FIG. 1 thereof, there is shown a preferred embodiment of apparatus, designated generally by the numeral 21. The apparatus 21 is designed for elevating a reel, designated generally by the numeral 22 and shown in phantom lines, having substantially circular flanges 23—23, and for supporting the elevated reel rotatably. The apparatus 21 is adjustable to elevate and support reels 22—22 of various outside diameters.

The apparatus 21 includes a main frame, designated generally by the numeral 26, which may be conveniently secured to a floor surface 27. The main frame 26 includes a pair of spaced, parallel supports 28—28. Forming a part of the main frame 26 are a pair of stands 32—32, which are secured to the supports 28—28 in aligned, parallel relationship each to another. A pair of columns 33—33 are mounted individually upon the stands 32—32. Each of the columns 33—33 is provided, at the upper end thereof, with a pair of elongated mounting plates 34—34 mounted in spaced parallel relationship each to another (FIGS. 1 to 4, inclusive).

Gear segments 36—36 are mounted fixedly upon associated shafts 37—37, which are mounted rotatably in bearings 38—38. The bearings 38—38 are mounted slidably on the associated mounting plates 34—34 and are adjustable longitudinally thereof by means of bolts 39—39. The bolts 39—39 are mounted adjustably through the blocks 41—41, which are secured at the opposite ends of the mounting plates 34—34. The bearings 38—38 are so adjusted that the longitudinal axes of the shafts 37—37 associated with one of the columns 33—33 are aligned with longitudinal axes of the respective shafts 37—37 associated with the other of the columns 33—33 so that the two associated shafts are rotatable about a common axis. The bearings 38—38 are further so adjustable that both of the common axes of rotation of the two pairs of shafts 37—37 are substantially parallel to each other and substantially perpendicular to the longitudinal axis of the main frame 26, and, therefore, to the supports 28—28.

An elongated arm 43 or 44 is formed integrally with each of the gear segments 36—36 forming two pairs of arms 43—43 and 44—44. An elongated, preferably antifriction, roller 45 is secured rotatably between each pair of arms 43—43 and 44—44 adjacent to the free ends thereof. The rollers 45—45 are so mounted that the longitudinal axes thereof are parallel to each other and to the common axes of rotation of the arms 43—43 and 44—44. The arms 43—43 and 44—44 are of such length that when the arms are in their normal position, as is shown in FIG. 1, whereat the rollers 45—45 are directly above the respective common axes, a reel 22 of a maximum desired size may be rolled upon the floor surface 27 beneath the rollers 45—45 into and out of the apparatus 21.

A pair of worm gear jacks, of conventional design, designated generally by the numerals 48—48 (FIGS. 3 and 4), are mounted individually within the associated columns 33—33 longitudinally thereof. The jacks 48—48 are provided with jack screws 49—49 which extend therethrough and into the associated stands 32—32. The jacks 48—48 are also provided with racks 50—50, which extend upwardly thereof through the respective columns 33—33 and are mounted individually on the upper ends of the associated ones of the jack screws 49—49 in such a manner as to permit relative rotation therebetween.

The racks 50—50 extend into the space between the gear segments 36—36 so that the racks mesh with the associated ones of the gear segments. The bearings 38—38 are also adjustable by means of the bolts 39—39 relative to the racks 50—50 to insure proper meshing of the gear segments 36—36 with the associated ones of the racks while retaining the proper alignment of the associated ones of the shafts 37—37 and substantially perpendicular relationship of the common axes of the latter to the vertical plane containing the longitudinal axis of the main frame 26.

Each of the jacks 48—48 is provided with one of input shafts 51—51. Rotation of the input shafts 51—51 causes corresponding rotation of the respective jack screws 49—49 in one direction or the other, depending on the direction of rotation of the associated ones of the input shafts. The reversible rotation of the jack screws 49—49 is transformed into reciprocable movement of the racks 50—50, which cause oscillation of the associated ones of the gear segments 36—36 and, therefore, corresponding oscillation of the arms 43—43 and 44—44.

A reversible, electric motor, designated generally by the numeral 55, such as a Type M Magnetic Unibrake Motor, manufactured by the Master Unibrake Company, Dayton, Ohio, is provided to drive the input shafts 51—51 of the jacks 48—48 and, therefore, to cause the desired oscillation of the arms 43—43 and 44—44. The motor 55 is provided with a conventional, spring-biased, friction disk-type brake (not shown) mounted axially of and operatively to the rotor (not shown), and, therefore to an output shaft 56 of the motor 55. When a coil 57 (FIG. 7) of the motor 55 is deenergized, a pressure plate (not shown) of the brake is spring-biased against the friction disk (not shown) to prevent rotation of the rotor of the motor. When the coil 57 of the motor 55 is energized, a coil 58 (FIG. 7) of brake magnets (not shown) is energized to withdraw the pressure plate to compress springs (not shown) of the brake and to release the pressure on the friction disk. The magnets hold the springs under compression as long as the coil 58 is energized, allowing the rotor of the motor 55 to rotate freely. As soon as the coil 57 is deenergized to stop the motor, the coil 58 of the brake magnets is deenergized also, releasing the springs of the brake, which force the pressure plate against the friction disk, to bring the rotor of the motor 55 to a quick stop. As a result, the rotation of the rotor of the motor 55 and, therefore, of the output shaft 56 is prevented as long as the coil 58 is deenergized.

Figure 2:
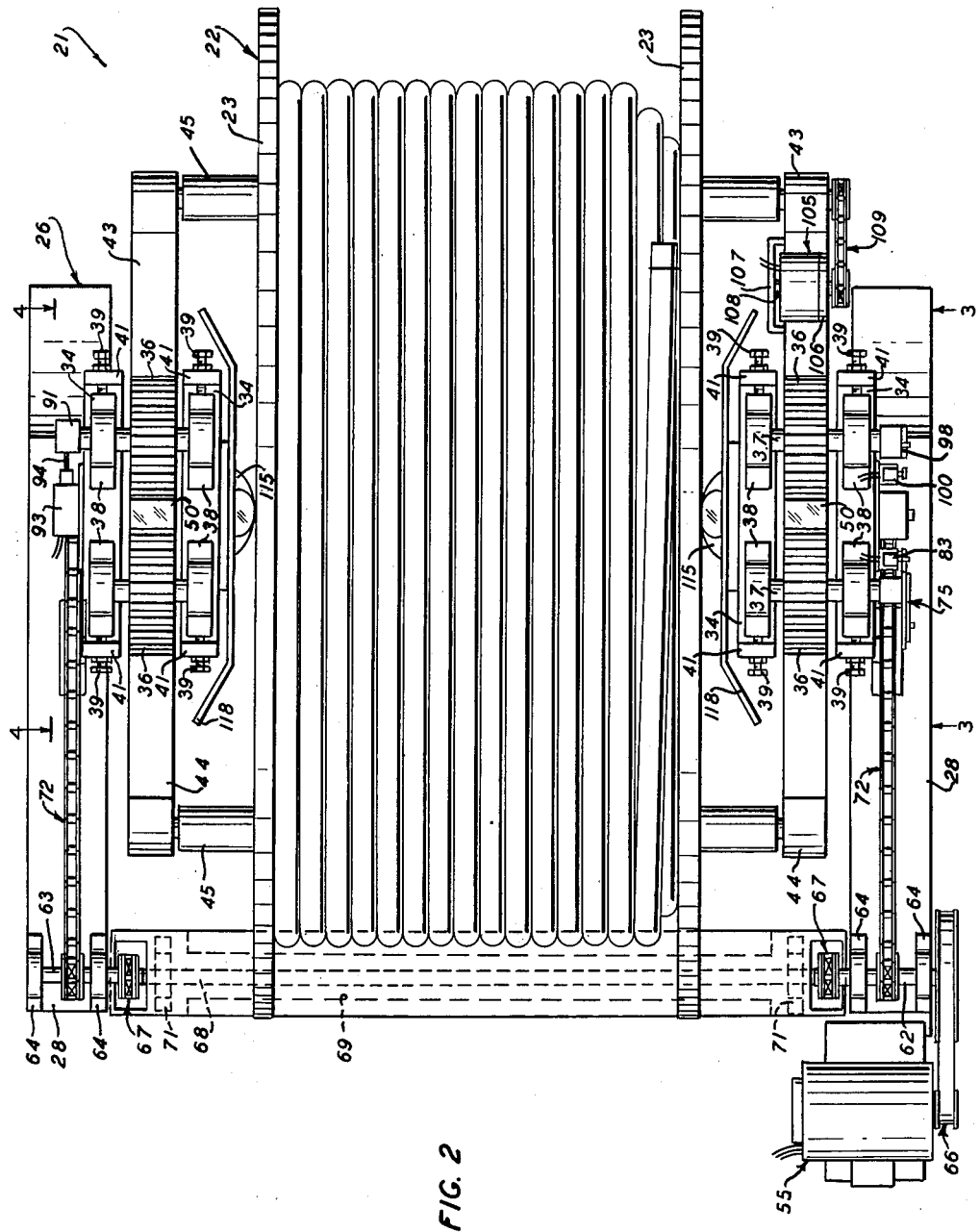
FIG. 2 is a top plan view of the apparatus shown in FIG. 1 with parts thereof shown in an operating position.

The motor 55 is mounted upon a bracket 61, which is secured to the associated one of the supports 28—28. Drive shafts 62 and 63 (FIG. 2) are mounted freely rotatably in the bearings 64—64, which are mounted on the respective ones of the supports 28—28. Rotation of the output shaft 56 is transmitted to the drive shaft 62 by means of a belt-and-pulley drive, designated generally by the numeral 66. Rotation of the drive shaft 62 is transmitted by means of chain-and-sprocket drives, designated generally by the numerals 67—67, and a transmission shaft 68 to the drive shaft 63. The transmission shaft 68 is mounted in a suitable recess 69 in the floor surface 27 by means of bearings 71—71 (FIG. 2). Rotation of the drive shafts 62 and 63 is transmitted by means of chain-and-sprocket drives, designated generally by the numerals 72—72, to the input shafts 51—51 of the respective jacks 48—48.

Figure 6:
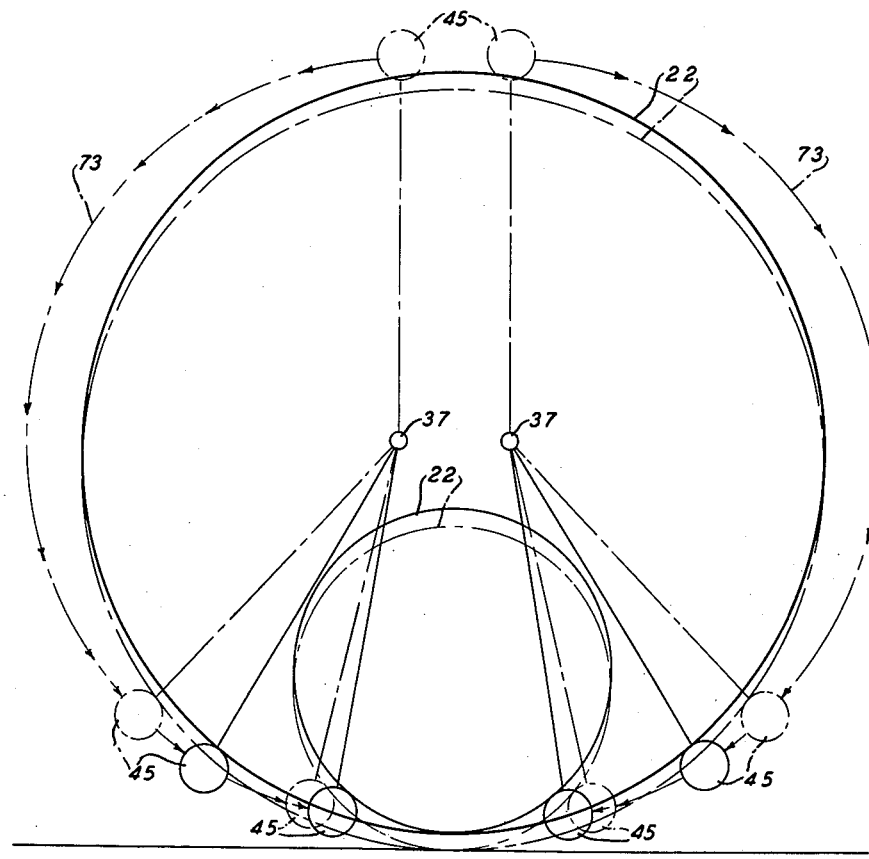
FIG. 6 is a schematic side elevational view of the apparatus of FIG. 1 showing various positions of the reel-elevating rollers engaging various sizes of reels.

Clockwise rotation of the output shaft 56 causes clockwise rotation of the input shafts 51—51 and upward movement of the racks 50—50. Upward movement of the racks 50—50 results in the clockwise movement of the arms 43—43 and, simultaneously, in the counterclockwise movement of the arms 44—44, as viewed in FIG. 1, from their normal positions, shown in FIG. 1, to various operated positions, one of which is shown in FIGS. 2 and 3 and two others are shown in solid lines in FIG. 6. Similarly, counterclockwise rotation of the output shaft 56 produces a downward movement of the racks 50—50. The downward movement of the racks 50—50 results in the counterclockwise movement of the arms 43—43 and, simultaneously, in the clockwise movement of the arms 44—44, as viewed in FIG. 1, from any one of the operated positions back into the normal position thereof. The simultaneous movement of the arms 43—43 and 44—44 in one or the other respective directions results in corresponding coordinated movement of the rollers 45—45 along respective arcuate paths 73—73 (FIG. 6). The arcuate paths 73—73 normally intersect the outer periphery of the flanges 23—23 of reels 22—22 of various sizes, positioned beneath the rollers 45—45 in their normal positions so that the longitudinal axis of each of such reels 22—22 is substantially parallel to and intermediate of the longitudinal axes of the rollers 45—45, below the central axes of such reels.

When the arms 43—43 move in the clockwise direction and the arms 44—44 in the counterclockwise direction, as viewed in FIG. 1, the rollers 45—45 move in the corresponding directions along the arcuate paths 73—73 in engagement with the outer periphery of the reel 22 below the central axis of the reel. Thereafter, the motor 55 tends to continue to move the arms 43—43 and 44—44 so that the rollers 45—45 tend to continue to move along their arcuate paths 73—73 so as to tend to apply clamping forces to the flanges 23—23 of the reel 22 on both sides thereof against the resistance offered by the weight of the reel 22. As a result, lifting components of the clamping forces tend to lift the reel 22 above the floor surface 27 while the rollers move along the outer periphery of the flanges 23—23. The motor 55 is so selected as to produce these lifting components in excess of those necessary to overcome the gravitational forces of the relatively large reel 22 of the desired maximum weight so as to raise the reel off the floor surface 27 to allow rotation of the reel 22 upon the rollers 45—45.

An adjustable stop mechanism, designated generally by the numeral 75 (FIG. 3), is provided to control the stoppage of the pairs of arms 43—43 and 44—44 and, therefore, the rollers 45—45 in desired operated positions. The stop mechanism 75 includes a segment 76 which is mounted freely rotatably on one of the shafts 37—37 associated with the corresponding one of the arms 44—44. The segment 76 is provided with a threaded member 77 and a strike plate 78. The stop mechanism 75 also includes a segment 79, which is mounted fixedly on the associated one of the shafts 37—37 for rotation therewith. The threaded member 77 of the segment 76 projects through a slot 81 in the segment 79. The segment 76 is adjustable into various positions relative to the segment 79 by means of a knob 82 mounted threadedly on the threaded member 77.

The stop mechanism also includes a normally closed limit switch 83 having an actuating arm 84 mounted on a plate 86. The position of the actuating arm 84 of the limit switch 83 is such that, when the arms 43—43 and 44—44 and, therefore, the rollers 45—45, reach predetermined operated positions thereof, the actuating arm 84 will be in the path of the movement of the strike plate 78. The strike plate 78 will actuate the actuating arm 84 to open the limit switch 83. Opening of the limit switch 83 will result in deenergization of the coil 57 and the brake coil 58 of the motor 55 to completely stop the movement of the arms 43—43 and 44—44 when the rollers 45—45 reach a predetermined operated position, such as the positions shown in solid lines relative to the large reel 22 in FIG. 6. The operated positions of the pairs of arms 43—43 and 44—44, and, therefore, of the rollers 45—45 may be controlled within a relatively wide range by adjusting the respective positions of the strike plate 78 relative to the segment 79.

A lower limit actuator 91 (FIG. 4), which is provided with a strike edge 92, is mounted fixedly on the associated one of the shafts 37—37 for rotation therewith. A normally closed limit switch 93, having an actuating plunger 94, is mounted on a plate 95. The limit switch 93 is mounted in such a manner that when the arms 43—43 and 44—44, and, therefore, rollers 45—45 approach their lowermost operated position, the actuating plunger 94 is in the path of the movement of the strike edge 92. The actuator 91 will operate the actuating plunger 94 to open the limit switch 93 to deenergize the coil 57 (FIG. 7) and the brake coil 58 of the motor 55 so as to completely stop the movement of the arms 43—43 and 44—44 when the rollers 45—45 reach their lowermost operated position. In this manner any posibility of damage to the apparatus in case of the failure of the limit switch 83 of the stop mechanism 75 is prevented.

An upper limit actuator 98 (FIG. 3), which is provided with a strike edge 99, is mounted fixedly on the associated one of the shafts 37—37 for rotation therewith. A normally closed limit switch 100, having an actuating arm 101 is mounted on the plate 86 in such a manner that when the arms 43—43 and 44—44, and therefore, rollers 45—45, approach their normal positions, the actuating arm 101 is in the path of the movement of the strike edge 99. The actuator 98 will operate the actuating arm 101 to open the limit switch 100 to deenergize the coil 56 and the brake coil 58 (FIG. 7) of the motor 55 to completely stop the rollers 45—45 in their normal position. In this manner any possibility of damage to the apparatus due to any further movement of the arms 43—44 toward each other is eliminated.

After the reel 22 is raised by the rollers 45—45 a desired distance above the floor surface 27, and the rollers are retained in such an operated position as to support the reel thereat, it may be necessary to withdraw cable from the reel. As the cable is withdrawn, the reel 22 rotates upon the rollers 45—45 and causes rotation of the latter by friction. It is sometimes desirable to retard or stop the rotation of the reel 22 either during the withdrawal of the cable therefrom or after the cable is withdrawn from the reel and the reel tends to continue to rotate by inertia.

In order to be able to retard or to stop the rotation of at least one of the rollers 45—45 and, therefore, to cause retardation or stoppage of the reel 22 by means of friction between the reel and the rollers, a conventional electromagnetic, friction disk-type brake 105 (FIGS. 1 and 2), of the type described with respect to the brake of the motor 55, is provided on one of the arms 43—43. The brake 105 is mounted on a pair of bracket plates 106 and 107, which are mounted to the associated one of the arms 43—43 for movement therewith. The brake 105 is also mounted operatively to a shaft 108 which is mounted freely rotatably in the bracket plates 106 and 107 and is connected operatively by means of a chain-and-sprocket drive, designated generally by the numeral 109, to the associated one of the rollers 45—45.

The brake 105 normally prevents the rotation of the shaft 108, and, therefore, of the associated one of the rollers 45—45. When it is desirable to release the braking action of the brake 105, a coil 110 (FIG. 7) is energized, whereby the brake 105 allows the free rotation of the shaft 108 and of the associated one of the rollers 45—45 until the coil 110 is deenergized again. The brake 105 is preferably selected to be easily adjustable for different amounts of friction so as not only to stop the roller 45 associated therewith, but also to retard the rotation of the roller 45 when desirable to apply selectively a desired amount of tension in the cable being unwound from a reel 22 in contact with the roller. In cases where it is desirable to alternately brake and rotate one of the rollers 45—45 to alternately brake or drive frictionally a reel 22 supported by the rollers 45—45, a brake-motor (FIG. 5), designated generally by the numeral 112, such as an M-type Unibrake Motor of a suitable size, may be provided on the associated one of the arms 43—43 instead of the brake 105.

A pair of thrust rollers 115—115 are mounted freely rotatably adjacent to the stands 32—32. The thrust rollers 115—115 are provided to guide the reels 22—22, being rolled into or out of the elevating position thereof, away from the columns 33—33, and, therefore, to reduce the possibility of damage to the apparatus 21. The thrust rollers 115—115 may also be mounted adjustably relative to each other in order to guide centrally of the frame 26, the reels 22—22 of various widths.

Guard plates 118—118 are mounted to the columns 33—33 on the adjacent sides thereof. The guard plates 118—118 are provided to guide the reels into the space between the columns 33—33 and also to eliminate any possibility of damage to the apparatus 21 by the reels being rolled into the elevating position.

Figure 7:
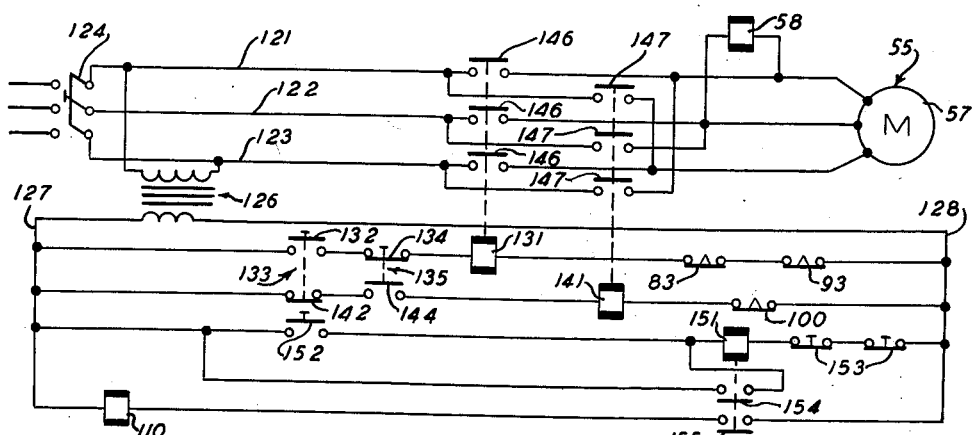
FIG. 7 is a schematic electrical control circuit for the apparatus of FIG. 1.

Referring now to FIG. 7, there is shown an electrical schematic diagram of the electrical circuit for the apparatus 21. Bus lines 121 to 123, inclusive, are connected, by means of a main switch 124, to a suitable source of supply of 440-v. alternating electric current. A transformer, designated generally by the numeral 126, the primary coil of which is connected to bus lines 121 and 123, is provided to supply bus lines 127 and 128 with the voltage of a desired value, such as 110-v., A.C.

One side of a coil of a relay 131 is connected to the bus line 127 through a normally open contact 132 of a push-button switch, designated generally by the numeral 133, and a normally closed contact 134 of a push-button switch, designated generally by the numeral 135. The other side of the coil of the relay 131 is connected to the bus line 128 through the normally closed limit switches 83 and 93. The coil of a relay 141 is connected to the bus line 127 through a normally closed contact 142 of the push-button switch 133, a normally open contact 144 of the push-button switch 135 and to the bus line 128 through the normally closed limit switch 100.

The relays 131 and 141 are provided with normally open contacts 146—146 and 147—147, respectively, which connect the coil 57 of the motor 55 to the bus lines 121 to 123, inclusive, and the coil 58 to the bus lines 121 and 122. Upon closing of either of the sets of contacts 146—146 or 147—147, the coil 57 and the brake coil 58 of the motor 55 become energized to release the braking action on the rotor of the motor 55 and to rotate the output shaft 56 of the motor 55. When the contacts 146—146 are closed, the rotor of the motor 55 rotates in the clockwise direction, as viewed in FIG. 1, which results in the movement of the rollers 45—45 from their normal positions illustrated in FIG. 1 toward the operated positions thereof illustrated in solid lines in FIGS. 2 and 6. When the contacts 147—147 are closed, the rotor of the motor 55 rotates in the opposite direction to cause the rollers 45—45 to move from their operated positions toward their normal positions. Upon opening of the closed set of the contacts 146—146 or 147—147, the coil 57 and the brake coil 58 of the motor 55 become deenergized whereby the rotation of the output shaft 56 and, therefore, the transverse movement of the rollers 45—45 is halted, so as to retain the rollers in the operated position.

The coil of a relay 151 is connected to the bus lines 127 and 128 through a normally open push-button switch 152 and through a pair of normally closed push-button switches 153—153 mounted individually on the columns 33—33. The relay 151 is provided with normally open contacts 154 and 155. The coil 110 of the brake 105 is connected to the bus bars 127 and 128 through the normally open contact 155 of the relay 151. Closing of the normally open switch 152 will cause energization of the coil of the relay 151, which will close its contacts 154 and 155. The closed contact 154 completes the circuit of the coil of the relay 151 bypassing the switch 152, so that when the latter is reopened, the coil of the relay 151 remains energized.

Closing of the contact 155 of the relay 151 results in energization of the coil 110 of the brake 105 so that the brake will release the associated one of the rollers 45—45 to allow the latter to rotate freely. One of the normally closed push-button switches 153—153 is provided on each of the columns 33—33 to permit deenergization of the coil of the relay 151 at any time to reopen the contacts 154 and 155. Reopening of the contact 155 results in deenergization of the coil 110 of the brake 105 and, therefore, in the braking action exerted by the brake 105 on the associated one of the rollers 45—45 to retard the rotation of the reel 22 in contact therewith.

*Operation*

It is assumed that at the beginning of the operation, the main switch 124 is closed. It is also assumed that the arms 43—43 and 44—44 are in a vertically upward position, and, therefore, the rollers 45—45 are in their normal uppermost positions, as is shown in FIG. 1. In this position, the strike edge 99 of the upper limit actuator 98 keeps the actuating arm 101 of the normally closed limit switch 100 depressed. Therefore, the limit switch 100 is open, interrupting the circuit of the coil of the relay 141 to insure that the contacts 147—147 thereof remain open during the beginning of the operation, even if the pushbutton switch 135 is depressed accidentally. It is also assumed that a reel 22, to be elevated, is positioned on the floor surface 27 between the columns 33—33 so that the longitudinal axis of the reel is substantially parallel to and intermediate of the common axes of rotation of the arms 43—43 and 44—44.

To start the operation of the apparatus 21, so as to elevate the reel 22 above the floor surface 27, an operator depresses the push-button switch 133 to close its normally open contact 132 and to open its normally closed contact 142. Closing of the contact 132 completes the circuit of the coil of the relay 131 to energize the latter. For safety reasons, the operator is required to keep the switch 133 depressed during the movement of the arms 43—43 and 44—44 to prevent any possibility of injury to the operator in the path of the movement of either of the arms.

Energization of the coil of the relay 131 results in closing of the contacts 146—146 thereof. Therefore, the coil 57 and the brake coil 58 of the motor 55 are energized to produce the clockwise rotation of the output shaft 56, as viewed in FIG. 1. The clockwise rotation of the output shaft 56 is transmitted by means of the belt-and-pulley drive 66 to the drive shaft 62. The clockwise rotation of the drive shaft 62 is transmitted by means of the associated one of the chain-and-sprocket drives 72—72 into the clockwise rotation of the input shaft 51 of the associated jack 48. Simultaneously, the clockwise rotation of the drive shaft 62 is transmitted by means of the chain-and-sprocket drives 67—67, the transmission shaft 68, the drive shaft 63 and the second of the chain-and-sprocket drives 72—72 into the clockwise rotation of the input shaft 51 of the other jack 48. Clockwise rotation of the input shafts 51—51 of the jacks 48—48 is transmitted into an upward linear movement of the racks 50—50. The racks 50—50 mesh with the associated gear segments 36—36 and cause simultaneously clockwise movement of the arms 43—43 and counterclockwise movement of the arms 44—44, as viewed in FIG. 1, and corresponding movement of the rollers 45—45 from the normal positions thereof shown in FIG. 1.

The operator then depresses momentarily the push-button switch 152 to complete the circuit of the coil of the relay 151. The coil of the relay 151, upon energization, closes its normally open contact 154 to look itself in and also closes its normally open contact 155 to energize the coil 110 of the brake 105. The energization of the coil 110 causes the brake 105 to release its braking action on the associated one of the rollers 45—45 so as to allow the roller to be freely rotatable.

Meanwhile, the arms 43—43 and 44—44 carry the rollers 45—45 along the respective arcuate paths 73—73 (FIG. 6) and into engagement with the outer periphery of the flanges 23—23 of the reel 22, which is positioned underneath the rollers 45—45 as is shown in phantom lines in FIGS. 1 and 6. Since the coil 57 and the brake coil 58 of the motor 55 remain energized, the arms 43—43 and 44—44 continue to carry the rollers 45—45 along their respective arcuate paths 73—73 so as to apply clamping forces on opposite sides of the flanges 23—23 of the reel 22 below the central axis thereof. These clamping forces, and particularly the lifting component thereof, cause the rotatable movement of the reel 22 and the rollers 45—45 relative to each other so that the reel is elevated above the floor surface 27 into a new position shown in solid lines in FIG. 6.

The segment 76 of the stop mechanism 75 is so adjusted relative to the segment 79 prior to the beginning of the operation that the strike plate 78 of the segment 76 engages the actuating arm 84 of the limit switch 83 substantially simultaneously with the rollers 45—45 engaging the reel 22. The relative positions of the strike plate 78 and the actuating arm 84 are so preselected that the strike plate 78 causes the actuating arm 84 to open the normally closed limit switch 83 at the time when the rollers 45—45 have raised the reel 22 a desired distance above the floor surface 27 (FIG. 6).

Opening of the limit switch 83 results in deenergization of the coil of the relay 131 and, therefore, in the opening of the contacts 146—146. As a result, the coil 57 and the brake coil 58 of the motor 55 are deenergized, whereupon the motor 55 is stopped instantaneously causing instantaneous stoppage of the arms 43—43 and 44—44 and, therefore, of the rollers 45—45 in their operated positions whereat the reel 22 is supported rotatably above the floor surface 27.

Thereafter, the cable may be withdrawn from the reel 22 by any suitable means in any suitable manner so that the reel 22 rotates on the rollers 45—45 and, by friction, causes the rotation of these rollers. If at any time during the unwinding operation or at the termination thereof, it is desirable to retard or to stop completely the rotation of the reel 22, the operator depresses either one of the normally closed switches 153—153 to interrupt the circuit of the coil of the relay 151. As a result the contacts 154 and 155 of the relay 151 are opened. Opening of the contact 155 results in deenergization of the coil 110 of the brake 105, causing braking of the rotation of the shaft 108 by the brake 105 and, therefore, of the associated one of the rollers 45—45. The braking action of the brake 105 is then transmitted by friction to the reel 22, resulting in retardation of the rotation of the reel. Depending on the adjustment of the brake 105 and whether the reel 22 is rotated by the cable being unwound or is freely rotatable, the brake will either tend to apply a continuous drag on the reel 22 to produce a desired amount of tensioning in the cable unwound from the reel 22 or will tend to completely stop the rotation of the reel.

When it is desirable to remove the reel 22 from the apparatus 21, the operator actuates the switch 135 to open the normally closed contact 134 and to close the normally open contact 144 thereof. Closing of the contact 144 results in energization of the coil of the relay 141, closing of the contacts 147—147 thereof, and in energization of both the coil 57 and the brake coil 58 of the motor 55. As a result, the output shaft 56 of the motor 55 rotates in the counterclockwise direction, as viewed in FIG. 1, i.e. in the direction opposite of that when the contacts 146—146 of the relay 131 were closed.

Counterclockwise rotation of the output shaft 56 of the motor 55 causes corresponding counterclockwise rotation of the input shafts 51—51 of the jacks 48—48 and, therefore, the downward movement of the racks 50—50. The downward movement of the racks 50—50 results in the counterclockwise rotation of the arms 43—43 and the clockwise rotation of the arms 44—44, and, therefore, in the corresponding movement of the rollers 45—45 along arcuate paths 73—73 from their operated, reel-supporting positions, shown in FIG. 2 and also in solid lines in FIG. 6, toward their normal positions shown in FIG. 1. Therefore, the reel 22 is again lowered onto the floor surface 27, whence it may be substituted by a new reel to be elevated.

When the arms 43—43 and 44—44, and, therefore, the rollers 45—45 approach their normal positions, the strike edge 99 of the upper limit actuator 98 engages the actuating arm 101 of the limit switch 100. The instant the rollers 45—45 reach their normal positions, the strike edge 99 causes the limit switch 100 to be opened so that the coil of the relay 141 is deenergized, whereupon the contacts 147—147 are opened. As a result the coil 57 and the brake coil 58 of the motor 55 are deenergized, whereupon the motor is stopped instantaneously causing instantaneous stoppage of the rollers 45—45 in their normal positions.

Thereafter, the reel 22 may be rolled out of the frame 26 and a new reel to be elevated is rolled into the frame in order to elevate and support the new reel in a way similar to that described hereinabove. In cases where reels of various outside diameters are to be operated upon, the various operated positions of the arms 43—43 and 44—44, and, therefore, of the rollers 45—45 are preset by simply adjusting the positions of the segment 76 relative to the segment 79 of the stop mechanism 75, to stop the rollers 45—45 in the desired operated position.

It will be understood that the above-described arrangements are simply illustrative of the application of the principles of the invention. Other arrangements may be devised by those skilled in the art which will embody the principles of the invention and fall within the spirit and scope thereof.

What is claimed is:

1. Apparatus for elevating and rotatably supporting reels, which comprises a framework having a passage therethrough into which a reel to be elevated may be rolled, a pair of elongated rollers, means mounted in the framework for mounting the rollers transversely of the passage for movement in arcuate paths in opposite directions relative to each other between a normal position, whereat the rollers are supported by the mounting means above the passage in the framework to prevent rollers from interfering with movement of the reel into and out of the passage, and a final operated position, whereat the rollers are substantially below the normal position thereof, and means for moving the rollers downwardly in the arcuate paths into engagement with opposite sides of a reel in the passage and below the central axis of the reel, which axis is positioned substantially parallel with the rollers when the reel is in the passage, and then further downwardly in the arcuate paths and toward the final operated position of the rollers to elevate the reel and support the reel rotatably.

2. Apparatus for elevating and rotatably supporting reels, which comprises a framework having a passage therethrough into which a reel to be elevated may be rolled, two pairs of arms, one arm of each of the pairs of arms being mounted pivotally on the framework on each side of the passage, each pair of arms having a roller rotatably mounted between the ends thereof and extending transversely of the passage, the arms normally supporting the rollers above the passage in the frame to prevent the rollers from interfering with movement of the reel into and out of the passage, and means for rotating the two pairs of arms in opposite directions relative to each other to move the rollers downwardly in arcuate paths into engagement with opposite sides of a reel in the passage below the central axis of the reel, which axis is positioned substantially parallel with the rollers when the reel is in the passage, and then further downwardly along the arcuate paths and toward each other to elevate the reel and support the reel rotatably.

3. Apparatus for elevating and rotatably supporting reels, which comprises a framework having a passage therethrough into which a reel to be elevated may be rolled, two pairs of arms, one arm of each of the pairs of arms being mounted pivotally at one end thereof on the framework on each side of the passage, a gear rigidly connected to the pivotally mounted end of each arm, each pair of arms having a roller rotatably mounted between the free ends thereof and extending transversely of the passage, the arms normally supporting the rollers above the passage in the frame to prevent the rollers from interfering with movement of the reel into and out of the passage, a pair of reciprocable driving racks individually mounted in the framework on each side of the passage, each driving rack meshing with the two gears connected to the arms mounted on each side of the passage, and a driver for reciprocating simultaneously the driving racks for rotating the two pairs of arms in opposite directions with respect to each other to move the rollers downwardly in arcuate paths around the opposite sides of a reel in the passage and into engagement with opposite sides of the reel below the central axis thereof, which axis is positioned substantially parallel with the rollers when the reel is in the passage, and then further downwardly along the arcuate paths and toward each other to elevate the reel and support the reel rotatably.

4. Apparatus for elevating and rotatably supporting reels, which comprises a framework positionable upon a floor surface, the framework having a passage therethrough into which a reel to be elevated may be rolled, two pairs of arms, one arm of each of the pairs of arms being mounted pivotally on the framework on each side of the passage, each pair of arms having a roller rotatably mounted between the ends thereof and extending transversely of the passage, the arms normally supporting the rollers above the passage in the frame to prevent the rollers from interfering with movement of the reel into the out of the passage, a driver for rotating the two pairs of arms in opposite directions relative to each other to move the rollers downwardly in arcuate paths into engagement with opposite sides of a reel in the passage below the central axis of the reel, which axis is positioned substantially parallel with the rollers when the reel is in the passage, and then further downwardly along the arcuate paths and toward each other to elevate the reel and support the reel rotatably, and braking means for retaining the arms in any desired instantaneous position so as to secure the rollers in the corresponding instantaneous position.

5. Apparatus for elevating and rotatably supporting reels, which comprises a framework positionable upon a floor surface, the framework having a passage therethrough into which a reel to be elevated may be rolled, two pairs of arms, one arm of each of the pairs of arms being mounted pivotally on the framework on each side of the passage, each pair of arms having a roller rotatably mounted between the ends thereof and extending transversely of the passage, the arms normally supporting the rollers above the passage in the frame to prevent the rollers from interfering with movement of the reel into and out of the passage, a driver for rotating the two pairs of arms in opposite directions relative to each other to move the rollers downwardly in arcuate paths into engagement with opposite sides of a reel in the passage below the central axis of the reel, which axis is positioned substantially parallel with the rollers when the reel is in the passage, and then further downwardly along the arcuate paths and toward each other to elevate the reel and support the reel rotatably, braking means for retaining the arms in any desired instantaneous position so as to secure the rollers in the corresponding instantaneous position, and means, responsive to the arms reaching a preselected instantaneous position corresponding to a preselected instantaneous position of the rollers in the arcuate paths whereat the reel is elevated by the rollers and is rotatably supported upon the rollers a predetermined distance above the floor surface, for actuating the braking means to secure the rollers in said preselected instantaneous position.

6. Apparatus for elevating and rotatably supporting reels, which comprises a framework having a passage therethrough into which a reel to be elevated may be rolled, two pairs of arms, one arm of each of the pairs of arms being mounted pivotally on the framework on each side of the passage, each pair of arms having a roller rotatably mounted between the ends thereof and extending transversely of the passage, the arms normally supporting the rollers above the passage in the frame to prevent the rollers from interfering with movement of the reel into and out of the passage, means for rotating the two pairs of arms in opposite directions relative to each other to move the rollers downwardly in arcuate path into engagement with opposite sides of a reel in the passage below the central axis of the reel which axis is positioned substantially parallel with the rollers when the reel is in the passage, and then further downwardly along the arcuate paths and toward each other to elevate the reel and support the reel rotatably, and means for selectively controlling the rotation of at least one of the rollers supporting the reel thereon in frictional contact therewith to selectively rotate or restrain rotation of a reel thereon.

7. Apparatus for elevating and supporting reels rotatably, which comprises a framework positionable upon a floor surface, the framework having a passage therethrough into which a reel to be elevated may be rolled, two pairs of arms, one arm of each of the pair of arms being mounted pivotally on the framework on each side of the passage, a pair of rollers extending transversely of the passage and being secured rotatably adjacent to the free ends of each pair of arms on opposite sides of the passage, driven means for rotating the arms to move the rollers in arcuate paths between a normal position, whereat the arms normally support the rollers above the passage in the frame to prevent the rollers from interfering with movement of the reel into and out of the passage, and a final operated position, whereat the rollers are substantially opposite the normal position thereof, said arcuate paths intersecting opposite sides of the reel in the passage below the central axis of the reel, which axis is positioned substantially parallel with the rollers when the reel is in the passage, and a driver for the driven means, the driver being selectively energizable for driving the driven means to rotate the arms in opposite directions relative to each other to move the rollers in the arcuate paths between the normal and the final operated positions thereof, the driver being also selectively deenergizable for stopping the rotation of the arms in any desired instantaneous position to secure the rollers in the instantaneous position so that the rollers, during the movement of the rollers toward the final operated position thereof, engage the opposite sides of the reel in the passage, elevate the reel above the floor surface and support the reel rotatably above the floor surface.

8. Apparatus for elevating and supporting reels rotatably, which comprises a framework positionable upon a floor surface, the framework having a passage therethrough into which a reel to be elevated may be rolled, two pairs of arms, one arm of each of the pair of arms being mounted pivotally on the framework on each side of the passage, a pair of rollers extending transversely of the passage and being secured rotatably adjacent to the free ends of each pair of arms on opposite sides of the passage, driven means for rotating the arms to move the rollers in arcuate paths between a normal position, whereat the arms normally support the rollers above the passage in the frame to prevent the rollers from interfering with movement of the reel into and out of the passage, and a final operated position, whereat the rollers are substantially opposite the normal position thereof, said arcuate paths intersecting opposite sides of the reel in the passage below the central axis of the reel, which axis is positioned substantially parallel with the rollers when the reel is in the passage, a driver for the driven means, the driver being selectively energizable for driving the driven means to rotate the arms in opposite directions relative to each other to move the rollers in the arcuate paths between the normal and the final operated positions thereof, the driver being also selectively deenergizable for stopping the rotation of the arms in any desired instantaneous position to secure the rollers in the instantaneous position so that the rollers, during the movement of the rollers toward the final operated position thereof, engage the opposite sides of the reel in the passage, elevate the reel above the floor surface and support the reel rotatably above the floor surface, and roller-position control means, responsive to the arms reaching a preselected instantaneous position corresponding to a preselected instantaneous position of the rollers in the arcuate paths whereas the reel is elevated by the rollers and is rotatably supported upon the rollers a predetermined distance above the floor surface, for deenergizing the driver to secure the rollers in said preselected instantaneous position.

References Cited in the file of this patent
UNITED STATES PATENTS

| | | |
|---|---|---|
| 2,326,684 | Ross | Aug. 10, 1943 |
| 2,904,273 | Turner et al. | Sept. 15, 1959 |